(12) United States Patent
Verschaeren

(10) Patent No.: US 6,387,503 B1
(45) Date of Patent: May 14, 2002

(54) MASKING FILM

(75) Inventor: Patrick Mathilde Corneel Verschaeren, Brecht (BE)

(73) Assignee: Hyplast N.V., Hoogstraten (BE)

( * ) Notice: Subject to any disclaimer, the term of this patent is extended or adjusted under 35 U.S.C. 154(b) by 0 days.

(21) Appl. No.: 09/382,241

(22) Filed: Aug. 24, 1999

(30) Foreign Application Priority Data

Aug. 24, 1998 (NL) .............................................. 1009936

(51) Int. Cl.$^7$ ................................................ B32B 27/36
(52) U.S. Cl. ...................................................... 428/412
(58) Field of Search ...................... 428/412; 264/176.1; 528/176, 193, 196, 194, 198, 271, 272, 332

(56) References Cited

U.S. PATENT DOCUMENTS 5,491,022 A    2/1996   Smith

FOREIGN PATENT DOCUMENTS

| EP | 0 612 611 A1 | 8/1994 |
| EP | 0 707 053 A2 | 4/1996 |
| GB | 2 192 585 A | 1/1988 |
| JP | 06210219 | 2/1994 |

*Primary Examiner*—Terressa M. Boykin
(74) *Attorney, Agent, or Firm*—Darby & Darby

(57) ABSTRACT

The invention relates to a masking film, which may or may not be combined with a substrate, such as paper, for varnishing surface parts. According to the invention the film consists of at least one layer of an absorbent polar material, which material is preferably an engineering polymer. The absorbent material is according to the invention usually a polymer such as are polyamide, polycarbonate, polybuteneterephthalate, polyetheneterephthalate, polyetherblockamide, polyetherblockester, polyurethane etherblockcopolymer, and blends of said polymers with polyolefins, or mixtures thereof. Usually the film according to the invention comprises several layers, i.e. three, five, seven or more.

8 Claims, No Drawings

MASKING FILM

FIELD OF THE INVENTION

The invention relates to a masking film, which may or may not be combined with a substrate, for varnishing surface parts.

BACKGROUND OF THE INVENTION

Traditionally, when varnishing surface parts, in particular of vehicles, one used paper because of its absorbing capacity. The surface part covered with paper is masked, that is to say, that part of the sheet-metal does not come into contact with paint or varnish. However, the disadvantage of using paper is that it has to be very strong and of high quality. If paper is too thin, the paint or varnish, usually applied by spraying, can penetrate to the parts of the sheet-metal which are supposed to be masked or protected. Because of these high quality requirements the costs for the paper are relatively high. Another disadvantage attached to the use of paper is the fact that paper saturated with varnish cannot be reused for paper production, as the paper is saturated with chemicals from the varnish. Therefore the paper with varnish and all must be discarded, which is a burden on the environment.

Later on plastic films were used, which in the beginning were mainly used to keep parts of the bodywork dust free and free of varnish. Such films are not suitable as masking film when varnishing as such, because when removing the film, the varnish which has come onto the film will flake off, and the flakes will land on the newly varnished part, necessitating post-treatment.

In order to avoid the disadvantage of the flaking of the varnish layer which has come onto the film, it was suggested in the European patent specification EP 277 552 to subject the masking film before use to a corona treatment, so that the varnish adheres to the film to the extent that flaking is avoided. A suitable corona pre-treatment affects the surface tension in the sense that the printing inks and varnishes adhere very well. In such a treatment of a plastic film without lubricant, for instance high density polyethene (HDPE), a surface tension of 45 dyn/cm can be achieved. It has been shown, that with such a treatment the film could be used for masking purposes for several months.

However, the above described prior art has the disadvantage that the film, prior to application as masking film, requires treatment with a corona charge, which treatment involves the use of extra and costly corona equipment.

Another disadvantage of the thus treated film is that, as mentioned before, the favourable effect of the treatment disappears after some time and that even after a few months there is not sufficient adhesion to retain the varnish which was sprayed on, so that flaking occurs, which is undesirable because the flakes then land on the newly sprayed bodywork parts which then require post-treatment.

More recently, in the pending European patent application EP 0 612 611 (application No. 94200428.4), applicant has provided an improvement with respect to the above-mentioned prior art.

The above-mentioned disadvantages are not present in said European patent application No. 0 612 611, so that it is suitable for masking purposes. EP 0 612 611 provides a masking film comprising one or more layers for selectively varnishing surface parts, in particular for a vehicle having a polar outer layer, wherein the polar outer layer is made from a polymer of copolymer or terpolymer, which of itself remains permanently polar, without any pre- or post-treatment.

The film of the European patent application 0 612 611 does indeed possess good paint- and ink-absorbent properties and is, moreover, resistant to temperatures up to 120–140° C. but not to temperatures of 160° C. and higher, as in the case of I.R. which is used for drying purposes.

OBJECTS OF THE INVENTION

The object of the invention is now to provide a masking film which does not have the disadvantages mentioned above, making it especially suitable for masking purposes.

DETAILED DESCRIPTION OF THE INVENTION

To this end the invention provides a masking film which may or may not be combined with a substrate, for varnishing surface parts, characterized in that the film is provided with at least one layer of an absorbent polar material.

Such a masking film possesses improved paint- and ink-absorbent properties and is, moreover, resistant to higher temperatures of $\geq 160°$ C., in particular when applying modern drying apparatuses having a higher surface tension and in addition use I.R. radiation.

Another advantage of such a film is that is possesses a higher surface tension, allowing the film to be used with all kinds of varnishes, and in addition possesses antistatic properties thus avoiding the attraction of dust.

The absorbent polar material is preferably a so-called engineering polymer. Polymers qualifying as such are polyamide, polycarbonate, polybuteneterephthalate, polyetheneterephthalate, polyetherblockamide, polyetherblockester, polyurethane etherblockcopolymer, and blends of said polymers with polyolefins, or mixtures thereof.

Usually polyamide is used, such as PA6, PA6.6, PA6/6.6, PA12, PA11, PA6/11, PA6/12, PA4/6, PA6/10, PA6/9, aromatic PA, or a mixture thereof.

The polyether is preferably PEG, PBG, PPG, or a mixture thereof.

The polyolefin is preferably PE, PP, or copolymers and terpolymers of PE and/or PP, or a mixture thereof.

The masking film may comprise one layer, a so-called monolayer, preferably PA. The masking film may be applied to a substrate or a carrier material such as, for example, paper or aluminium if even higher temperature resistances or non-stretch film is required. However, the use of a substrate is not strictly necessary.

Preferably, however, the masking film according to the invention is multi-layered, so that in addition to the absorbent layer, the film is provided with an extrusion-facilitating layer.

The film comprises preferably at least three layers, wherein the top and bottom layers are absorbent layers, while an extrusion-facilitating layer serves as inner layer.

This safeguards the strength of the masking film during production and makes it easier to handle during use.

Advantageously the extrusion-facilitating layer, located at the side of the absorbent layer, is provided with an adhesive layer or tie.

It has been shown to be advantageous if the extrusion-facilitating layer at the side of the absorbent layer is an acid anhydride-grafted polyolefin or a mixture thereof with a polyolefin. Usually the acid anhydride is maleic acid anhydride.

As polyolefin one usually uses PE, PP or a co- or terpolymer of PE and/or PP, or a mixture thereof.

The film according to the invention may comprise at least three layers. It is, of course, possible to use more than three layers, depending on the desired film properties to be obtained. For example, a masking film comprising seven layers (bottom layer/adhesive layer/middle layer/middle layer/middle layer/adhesive layer/outer layer) may be used, exhibiting very good extrusion properties.

In accordance with an embodiment according to the present invention, the bottom layer is made of polypropylene, polyethylene, polyamide and polyethyleneterephthalate (PET). With a bottom layer of polypropylene such a bottom layer is resistant to temperatures of approximately 160° C.

In accordance with a very favourable embodiment the bottom layer is made of polyamide 6/6.6. This renders the bottom layer resistant to temperatures of approximately 190° C. The extrusion-facilitating layer is preferably made of a polyolefin. More preferably the polyolefin is polyethylene (P), polypropylene (PP), a copolymer of PE and PP or a terpolymer of PE and PP. A further preferred variant is that the polyolefin is grafted with an acid anhydride group, preferably maleic acid anhydride.

In accordance with the present invention the outer layer is made of polycarbonate, polybuteneterephthalate, polyetheneterephthalate, polyamide, polyetherblockamide, polyetherblockester, polyurethane etherblockcopolymer, or copolymers of said polymers with polyolefins.

The polyamide is PA6, PA6.6, PA6/6.6, PA12, PA11, PA6/11, PA6/12, or aromatic PA. The polyether is polyethyleneglycol (PEG), polybuteneglycol (PBG), and polypropyleneglycol (PPG). The special feature of the absorbent outer layer of the present invention is that it is particularly suitable for solvent- or water-based paints and powder varnishes.

An embodiment that particularly merits preference is a film wherein both the bottom and outer layer is made of polyamide 6/6.6. This renders the film as a whole very resistant to a high temperature. A particular advantage when using a bottom and outer layer of the same material, in this case PA 6/6.6, is that when processing the film there is no need to mark the film in order to indicate which side is bottom or top.

Abbreviations:
PA6.6 [—NH(CH$_2$)$_p$NH—CO(CH$_2$)$_q$CO—]$_n$ 12 carbon atoms (p=6/q=4)
PA6 [—NH(CH$_2$)$_m$—CO—]$_n$ 6 carbon atoms (m=5)
PA6.10 [—NH(CH$_2$)$_p$NH—CO(CH$_2$)$_q$CO—]$_n$ 16 carbon atoms (p=6/q=8)
PA6.12 [—NH(CH$_2$)$_p$NH—CO(CH$_2$)$_q$CO—]$_n$ 18 carbon atoms (p=6/q=10)
PA11 [—NH(CH$_2$)$_m$—CO—]$_n$ 11 carbon atoms (m=10)
PA12 [—NH(CH$_2$)$_m$—CO—]$_n$ 12 carbon atoms (m=11)
PA6.9 [—NH(CH$_2$)$_p$NH—CO(CH$_2$)$_q$CO—]$_n$ 15 carbon atoms (p=6/q=7)
PA12.12 [—NH(CH$_2$)$_p$NH—CO(CH$_2$)$_q$CO—]$_n$ 24 carbon atoms (p=12/q=10)
PA4.6 [—NH(CH$_2$)$_p$NH—CO(CH$_2$)$_q$CO—]$_n$ 10 carbon atoms (p=4/q=4)
PA6/6.6 This is a blend of PA 6.6 and PA 6 [—NH(CH$_2$)$_p$NH—CO(CH$_2$)$_q$CO—]$_n$ and [—NH(CH$_2$)$_m$—CO—]$_{n'}$ Examples of polyester are polybuteneterephthalate and polyetheneterephthalate.

Examples of polyether are PEG polyethyleneglycol, PBT polybutyleneglycol and PPG polypropyleneglycol.

Examples of multi-layer masking films are:

EXAMPLE 1

This is an example of a seven-layer masking film obtained by coextrusion, whose layers successively are assembled as follows:
first layer PA
second layer Tie
third layer PE1
fourth layer PE2
fifth layer PE3
sixth layer Tie
seventh layer PA.

EXAMPLE 2

This is an example of a five-layer masking film obtained by coextrusion, which film is comprised of the following layers:
first layer PA
second layer Tie
third layer P
fourth layer Tie
fifth layer PA.

EXAMPLE 3

This is an example of a masking film comprising the following three layers:
first layer PA
second layer Tie
third layer PA.

EXAMPLE 4

This is an example of a masking film consisting of one layer, a so-called monolayer, which comprises PA.

EXAMPLE 5

This is an example of a masking film consisting of the following five layers:
first layer PA
second layer Tie
third layer PE1
fourth layer PE2
fifth layer PE3.

EXAMPLE 6

This is an example of a masking film consisting of the following five layers:
first layer PA
second layer Tie
third layer PE1
fourth layer PE2
fifth layer PP.

It will be obvious that the present invention is not limited to the masking films mentioned in the examples, but that the invention extends to all other films as specified by the appended claims.

What is claimed is:
1. A masking film for varnishing surface parts, wherein the film comprises
a) at least one layer of an absorbent polar material resistant to a temperature of 160° C. and higher selected from the group consisting of polyamide, polycarbonate, polybuteneterephthalate, polyetheneterephthalate, polyetherblockamide, polyetherblockester, polyure- thane etherblockcopolymer, and blends of said polymers with polyolefins, or mixtures thereof; and b) an extrusion-facilitating layer located at the side of the absorbent layer comprising an acid anhydride-grafted polyolefin or a mixture of an acid anhydride-grafted polyolefin and a polyolefin.

2. A film according to claim 1, wherein the polyamide is PA6, PA6.6, PA6/6.6, PA12, PA11, PA6/11, PA6/12, PA4/6, PA6/10, PA6.9, aromatic PA, or a mixture thereof.

3. A film according to claim 1, wherein the polyether is PEG, PBG, PPG, or a mixture thereof.

4. A film according to claim 1, wherein the polyolefin is PE, PP, or copolymers and terpolymers of PE and/or PP, or a mixture thereof.

5. A film according to claim 1, wherein the film comprises at least three layers, wherein the top and bottom layers are absorbent layers, and an extrusion-facilitating layer serves as inner layer.

6. A film according to claim 1, wherein the extrusion-facilitating layer, located at the side of the absorbent layer, is provided with an adhesive layer.

7. A film according to claim 1, wherein the acid anhydride is maleic acid anhydride.

8. A film according to claim 1, polyolefin is PE, PP, or a copolymer or terpolymer of PE and/or PP, or a mixture thereof.

* * * * *